United States Patent
Giro Amigo

(10) Patent No.: US 9,944,467 B2
(45) Date of Patent: Apr. 17, 2018

(54) TRANSPORT SYSTEM SUITABLE FOR TRANSPORTING BUCKETS IN A COMBINATION WEIGHING MACHINE

(71) Applicant: GIRNET INTERNACIONAL, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 0 days.

(21) Appl. No.: 15/341,141

(22) Filed: Nov. 2, 2016

(65) Prior Publication Data
US 2017/0121119 A1    May 4, 2017

(30) Foreign Application Priority Data
Nov. 2, 2015 (ES) .................................. 201531568

(51) Int. Cl.
| | | |
|---|---|---|
| *B65G 17/16* | (2006.01) | |
| *B65G 17/12* | (2006.01) | |
| *B65G 17/36* | (2006.01) | |
| *G01G 19/387* | (2006.01) | |

(52) U.S. Cl.
CPC ........... *B65G 17/123* (2013.01); *B65G 17/36* (2013.01); *G01G 19/387* (2013.01); *B65G 17/16* (2013.01)

(58) Field of Classification Search
CPC .... B65G 17/12; B65G 17/123; B65G 17/126; B65G 17/36; G01G 19/387
USPC ................................................. 198/710, 799
See application file for complete search history.

(56) References Cited

U.S. PATENT DOCUMENTS

| | | | | |
|---|---|---|---|---|
| 2,369,840 A | * | 2/1945 | Nalbach | A21B 1/48 198/799 |
| 2,414,164 A | | 1/1947 | Nalbach | |
| 2,702,625 A | * | 2/1955 | Hapman | B65G 17/123 198/701 |
| 2,886,166 A | | 5/1959 | Lens | |

(Continued)

FOREIGN PATENT DOCUMENTS

| | | |
|---|---|---|
| EP | 0 803 716 A2 | 10/1997 |
| EP | 0 982 570 A2 | 3/2000 |

(Continued)

OTHER PUBLICATIONS

Communication dated Feb. 24, 2017 issued by the European Patent Office in counterpart application No. 16382501.
Spanish Search Report for 201531568 dated May 11, 2016.

*Primary Examiner* — James R Bidwell
(74) *Attorney, Agent, or Firm* — Sughrue Mion, PLLC

(57) ABSTRACT

A transport system designed to transport buckets in a combination weighing machine that uses two endless chain drives horizontally offset at a distance A, the system comprising carriages to carry the buckets which extend between, and are joined to, the chains such that the simultaneous and coordinated motion of the chains moves the carriages along a closed path with curved sections, the system comprising control gears for the inclination of the carriages on the curved sections of the path, which comprise castor wheels actuated in a coordinated fashion with the chains around both turn axes n, at least one of which placed in the vicinity of each curved section linking the carriages and prepared to mesh with contact elements arranged for such purposes on the carriages.

5 Claims, 7 Drawing Sheets

(56) References Cited

U.S. PATENT DOCUMENTS 3,080,040 A * 3/1963 Gibbons .................. A21B 1/46
  198/799
6,006,897 A   12/1999 Faure et al.
6,394,260 B1 * 5/2002 Barth ..................... B65G 1/127
  198/799

FOREIGN PATENT DOCUMENTS

| EP | 1176405 A2 | 1/2002 |
| FR | 2615837 A1 | 12/1988 |
| GB | 1 289 256 A | 9/1972 |
| JP | 2000-118667 A | 4/2000 |

* cited by examiner

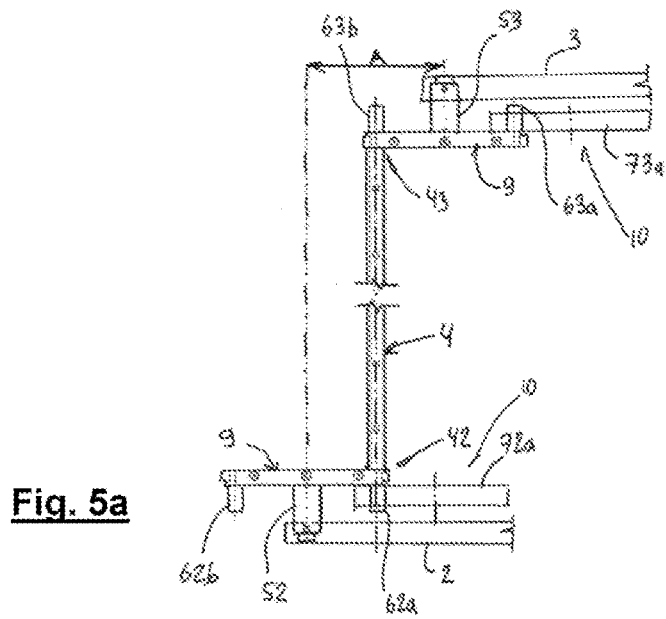
Fig. 5a
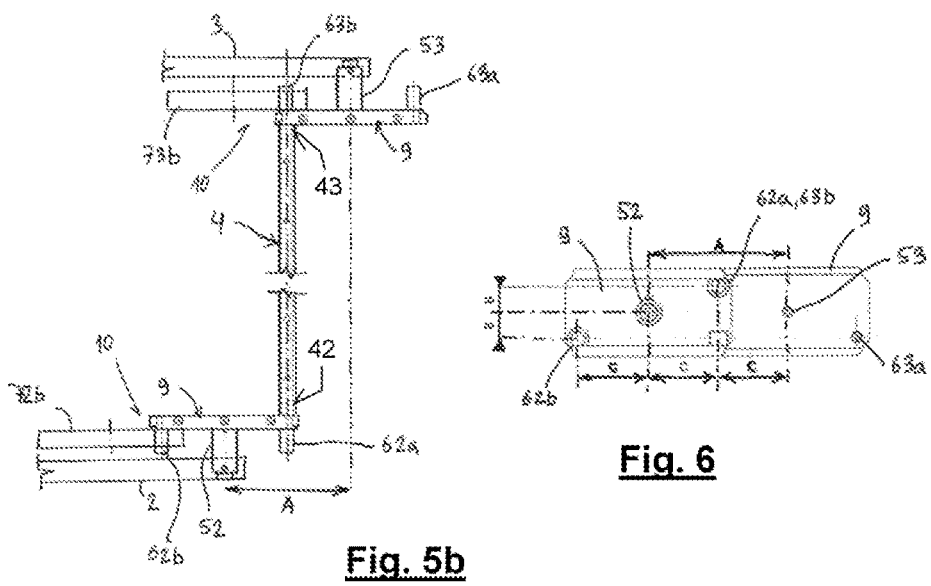
Fig. 5b
Fig. 6

TRANSPORT SYSTEM SUITABLE FOR TRANSPORTING BUCKETS IN A COMBINATION WEIGHING MACHINE

TECHNICAL FIELD OF THE INVENTION

The invention relates to transport system for buckets specifically suitable to transport buckets in a combination weighing machine.

BACKGROUND OF THE INVENTION

Currently there are weighing machines comprising two parallel chain drives between which carriages are arranged, joined to the chains so that the coordinated motion of these in the same direction makes the carriages move along a closed path in which conventionally a horizontal straight upper advance section, a lower horizontal straight return section and certain curved sections are distinguished. Buckets are attached to these carriages, and the machines comprise a plurality of work stations distributed along the path of the carriages, and by extension along the path of the buckets attached to the carriages, such as a loading station where fruit is fed into the buckets; a weighing station where the fruit contained in each bucket is weighed; and an emptying or unloading station where the buckets are emptied.

In so-called combination weighing machines, several buckets are attached to the same carriage, and at the emptying station there is a selective emptying of the buckets whose total fruit weight is closest to a predetermined value.

An example of a weighing machine of the type described above is found in patent document EP 0982570.

The form of the buckets varies as a function of the needs and the nature of the products that must be transported, but it is necessary that the type of weighing machines previously described, which use similar transport systems, control the inclination of the buckets so that they do not accidentally spill the products contained inside them during transportation.

Conventionally, in order to guarantee that the buckets maintain the same orientation during their path, at their ends, the carriages are connected in an articulated way to the chains, or mounted to rotate around the axes of the chains, and the transport system is completed with rails or guides in which runners, bearings or similar devices that have the same effect on the carriages, are inserted in slide mode. This form of control is necessary to maintain the orientation of the carriages and, therefore, of the containers secured to the carriages during the curved sections that link the straight upper advance section and the lower straight return section. An example of orientation control based on rails or guides on a weighing machine of the type previously described is exemplified in the patent document EP 0803716.

The use of these rails or guides, however, has serious problems of wear and noise from the machines, which require a lot of work in maintenance and reparation.

An objective of the present invention is a transport system of buckets specifically designed to transport buckets in a combination weighing machine that solves these problems, meaning that it allows the rails or guides used by the known systems to be suppressed in order to control the orientation of the carriages on the curved sections of the closed path.

Through the patent document JP 2000118667, knowledge is available on a transport system for trays that could be suitable for transporting buckets in a weighing machine. The system proposed in JP2000118667 sets forth the characteristics according to the preamble of claim 1 of the present patent application.

Although the system described notably improves the control of the orientation of the trays, especially on straight sections through the use of two chains that are horizontally offset and by joining of the carriages to each chain through individual arms which are also horizontally offset at the same distance as the difference between chains, it still needs to use a rail or guide into which a follower element mounted on each carriage is inserted in slide mode during the curved sections of the path of these carriages in order to maintain the desired orientation. The difference between the chains makes it so that there is much less mechanical interference between the rail and the followers, and therefore makes it possible to reduce the wear of these components, but it does not avoid the fact that rails or guides will still need to be used in order to guarantee a proper orientation in this case of the trays.

DESCRIPTION OF THE INVENTION

The transport system according to the invention comprises a first and a second endless chain drive, each one defining a closed path with a horizontal straight upper advance section, a lower horizontal straight return section and respective curved sections around corresponding centers of curvature r that link the mentioned advance and return sections, the first and second chains arranged parallel to each other but horizontally offset at a distance A. The system further comprises a series of carriages to carry the buckets which extend between the chains and which are connected in an articulated way to the chains by individual joining arms that are horizontally offset at the same distance A, all of which in such a way that the simultaneous and coordinated motion of the first and second chain makes the carriages move along a closed path in which a horizontal straight upper advance section, a lower horizontal straight return section and curved sections linking the mentioned advance and return sections are distinguished.

The system of the invention is characterized in that it comprises control gears for controlling the inclination of the carriages on the curved sections of the path, which comprise castor wheels that are operable in coordination with the chains around each turn axis n, being placed at least one of said castor heels near each curved section of the carriages path and ready to engage or mesh with contact elements arranged for such purpose in the carriages, all of which in such a way that on said curved sections the inclination of each carriage is conditioned by the meshing that takes place between at least one of the contact elements and a castor wheel.

Advantageously, control of the inclination of the carriages on the curved sections is not carried out by contact between a fixed component, such as a guide rail of the chassis of the machine and a mobile component, such as a follower that moves with the carriage.

In the system according to the invention, the control of the inclination is done by components that move simultaneously, meshed in this case, which reduces the wear of the components that intervene in this control and especially reduces the wear with respect to solutions that use fixed guides and followers which continuously rub against each other.

The system of invention thereby reduces the noise that is produced in systems with guides and followers, noise that is caused by the continuous rubbing of the followers as they pass by the guides, especially when their paths intersect.

Moreover, the elimination of this continuous rubbing also helps make the system mechanically more robust, meaning the mechanical misalignment between the pieces is much less frequent, which makes it so there is less maintenance to be done and fewer machine stops in the machine that uses the transport system according to the invention.

In an embodiment, the contact elements comprise a set of protrusions arranged in the carriages and configured to mesh in corresponding recesses provided in the castor wheels.

During the curved sections, the carriages are accompanied by these castor wheels, which carry out a function similar to a scoop wheel. In practice, during the meshing with the castor wheels, the contact protrusions will trace a circular path around the turn axis n of the castor wheels.

In an embodiment, in each curved section of a carriage path, at least two protrusions of the carriage fit individually into a recess of a different castor wheel. In practice, this embodiment implies the arrangement of at least two castor wheels in the area of influence of each curved section of the carriages path.

When the distance between the chains is considerable, this characteristic allows the carriages to be supported on the curved path, in addition to on the arms of the carriage that are joined to the chains, by more than one added point with the corresponding castor wheels. This helps enable the entire carriage to maintain its orientation as intended and makes it so the orientation is not affected by the effects of the sagging of the carriage when it is supporting several buckets or when the weight distribution throughout its longitude is not balanced.

With the number of castor wheels being four, each one located near each curved section of each chain, the invention provides that each carriage is equipped with a first and second gear end to mesh with the corresponding castor wheels, each one with at least a pair of protrusions, of which at least one in each gear end in each curved path of the carriage cooperates with a recess of the castor wheel located in the corresponding curved section of the associated chain.

According to this characteristic, each carriage will be supported on both ends and by means of at least one corresponding protrusion at each end of a different castor wheel. The arrangement of the wheels in the area of each curved section of a chain helps make the system suitable, for example, for weighing machines that include weighing, loading and unloading stations for the buckets that are transported, for example on the straight sections. The means of transmission or actuation of the castor wheels do not interfere in the space that these workstations need.

The invention provides that the protrusions on each gear end of the carriage are not necessarily horizontally aligned.

In accordance with a variant of the invention, the at least one protrusion that at each end of the gear of the carriage cooperates with a castor wheel located on the corresponding curved section of the associated chain is horizontally offset at a distance C with the joining arm that connects the carriage to each associated chain; and the turn axis n of the castor wheel that cooperates with the aforementioned protrusion is horizontally offset at the same distance C with respect to the center of curvature r of the curved section that this same chain follows.

The invention provides that is not necessarily the same protrusion that cooperates with the castor wheel of a curved section on one end of the chain, as the one that cooperates with the castor wheel of another curved section on the other end of the chain.

In a variant that is particularly interesting, the number of protrusions in each end of the gear with the castor wheels is two, arranged in the advanced direction of the carriage, one on each side of the joining arm that connects each carriage to a chain and equidistant from said joining arm at a same horizontal distance C; and arranged at a different level with respect to said joining arm, one on top and one below the one on top, equidistant of said joining arm at the same vertical distance B.

For an ideal mechanical coupling, the castor wheels located on the curved sections of the same chain that cooperate with protrusions from the same end of the gear of the carriage have their turn axes n vertically offset at the same distance B with respect to the center of curvature r of the aforementioned curved sections of the chains.

In accordance with an embodiment that reduces the number of different components of the system, the protrusions, and the joining arm on each gear end of the carriage for joining the castor wheels and for connecting the carriage to the associated chain, respectively, are supported on the same fixed plate a, or formed in the carriage, all of the plates having the same form as the arrangements of the protrusions on the fixed plates to one side and to the other of the carriage is symmetric around the origin formed by the joining arm; and in correspondence the castor wheels of the same chain are arranged symmetrically around the origin formed by the center of curvature r.

Advantageously, it is not necessary to have different plates for each chain and furthermore, the support chassis of the castor wheels associated with a chain can be the same as that of the castor wheels associated to the other chain, rotated 180°.

BRIEF DESCRIPTION OF THE DRAWINGS

FIGS. 5a and 5b are both schematic plan views of the same areas that are illustrated in FIGS. 4a and 4b, respectively;

FIG. 6, in a side view of a carriage of this same transport system;

DETAILED DESCRIPTION OF THE EMBODIMENT

Figure 1:
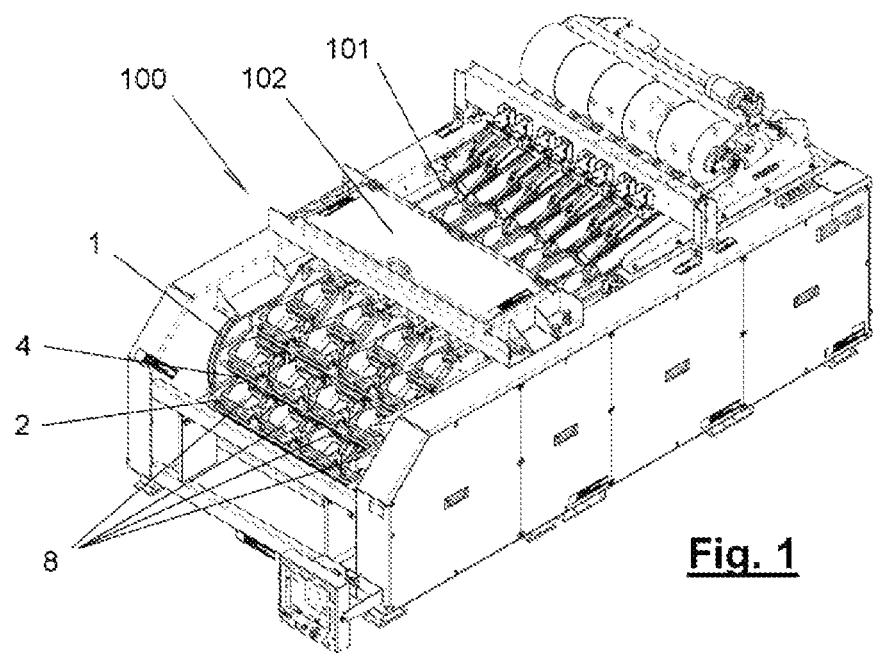
FIG. 1 is a general view of a dynamic weighing machine with a transport system for carriages to carry buckets according to the invention.

FIG. 1 shows a dynamic weighing machine 100 that includes a transport system 1 of carriages 4 that provide support for a series of buckets 8. The carriages are transported along a closed path such that the buckets pass through a loading station 101 for products to be weighed; a weighing station 102 where the products loaded in the buckets are weighed; and an unloading station (not shown due to its location on the lower part of the machine) where the content of the buckets is selectively unloaded, the total product weight of which is closer to a predetermined value.

Figure 2:
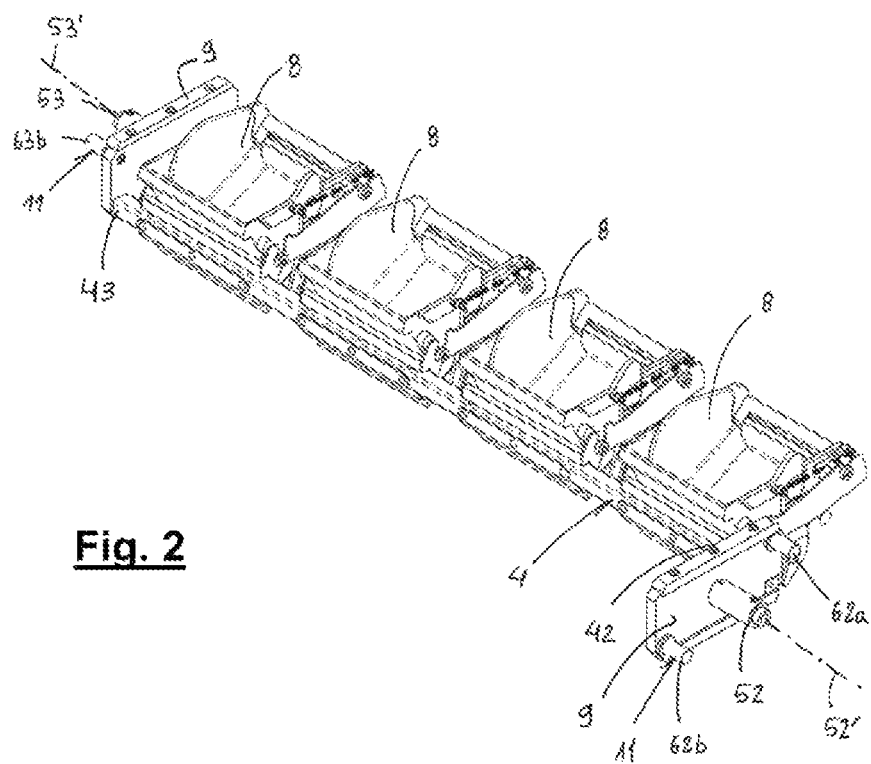
FIG. 2, is a perspective view of one of the carriages that carry buckets with a series of buckets arranged in rows coupled to the carriage.

FIG. 2 shows one of the carriages 4 that carries buckets 8 in greater detail. In the present example, the buckets are coupled to the carriage 4, arranged in rows.

In the carriage 4 there are two joining arms 52 and 53 that join the carriage at its ends to both endless chains 2 and 3 which are actuated simultaneously in the same direction producing the transport of the carriage 4. The joining with the chains 2 and 3 is articulated, such that the carriage 4 has the possibility to rotate around the axes 52' and 53'.

Each one of the joining arms 52, 53 on each side of the carriage 4 is supported on a plate 9. The two plates 9 are also provided with contact elements 11, in the form of protrusions, that cooperate to maintain the orientation of the carriage 4 during the curved sections of its path, as will later be explained in detail.

With the goal of making it so that the orientation of the carriage 4 does not vary during its transport, the connecting points of the carriage 4 to each one of chains 2 and 3 are horizontally offset at a distance A, meaning that the aforementioned axes 52' and 53' are offset and will be maintained essentially at the same level during the transport of the carriage 4 by the fact that the chains 2 and 3 are horizontally offset at the same distance A.

Figure 3:
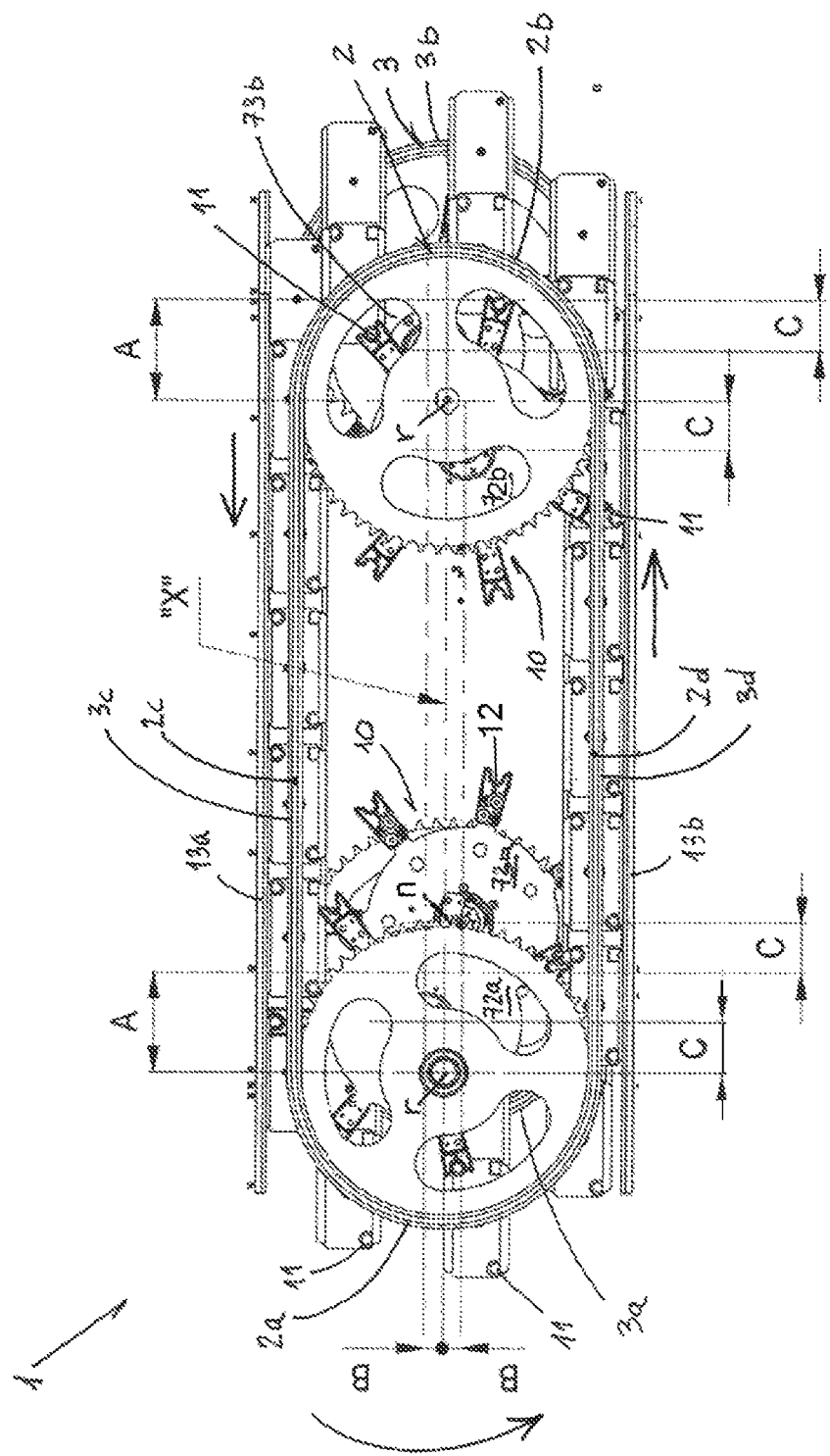
FIG. 3, is a schematic of view of the transport system that enables the motion of the carriages maintaining the same orientation, in this case horizontal.

Indeed, FIG. 3 in its entirety shows the transport system 1, distinguishing a first and second endless chain drive 2, 3, each one of which defines a closed path with a horizontal straight upper advance section 2c, 3c, a lower horizontal straight return section 2d, 3d and the curved sections 2a; 2b; and 3a; 3b, linking the aforementioned advance and return sections, around the respective centers of curvature r. The first and second chains 2, 3 are parallel but are horizontally offset by the distance A. Between the chains 2, 3 the carriages 4 extend as shown in FIG. 2, connected in an articulated way through joining arms 52, 53 that are horizontally offset at the same distance A.

The simultaneous and coordinated motion of the first and second chains 2, 3 makes the carriages 4 move along a closed path in which are distinguished a horizontal straight upper advance section, a lower horizontal straight return section and curved sections linking the aforementioned advance and return sections in the direction indicated by the arrows in FIG. 3.

To aid in the control of the orientation of the carriages 4 on the curved sections, the system 1 comprises control gears 10 that comprise four castor wheels 72a; 72b; 73a; 73b, each one located in the vicinity of each curved section 2a; 2b; 3a; 3b of each chain 2, 3 and around both turn axes n, prepared to mesh with contact elements 11 arranged for such purpose on the carriages 4. In the system 1 of the example, the castor wheels 72a; 72b; 73a; 73b are provided with corresponding recesses 12 that receive and accompany these contact elements 11 on their path which are placed for this purpose on the carriages 4. In this way it is guaranteed in the system 1 of the example that the carriages 4 maintain a perfect horizontal orientation during the curved paths and, therefore, so do the buckets 8 supported on the carriages 4.

In the example, the two protrusions 62a and 62b; 63a and 63b that there are on each gear end 42, 43 (see FIGS. 2 and 6), respectively, of the carriage 4 to mesh with a castor wheel are equidistant at a horizontal distance C from the joining arm 52, 53 that connects each end of the carriage 4 to the associated chain 2, 3 and as a consequence the turn axes n of the castor wheels 72a; 72b; and 73a; 73b that cooperate with these protrusions are horizontally offset at the same distance C with respect to the center of curvature r of the curved section that these same chains follow, all of which as shown in FIG. 3.

The arrangement of the protrusions on the plates 9 is also symmetric around the origin formed by the joining arm 52 or 53, being arranged above or below the level of the plates at a distance B (see FIG. 6). In correspondence the castor wheels of the same chain are also symmetrically arranged around the origin formed by the center of curvature r, with the turn axes n above or below the centers of curvature r at a distance B.

Figure 4A:
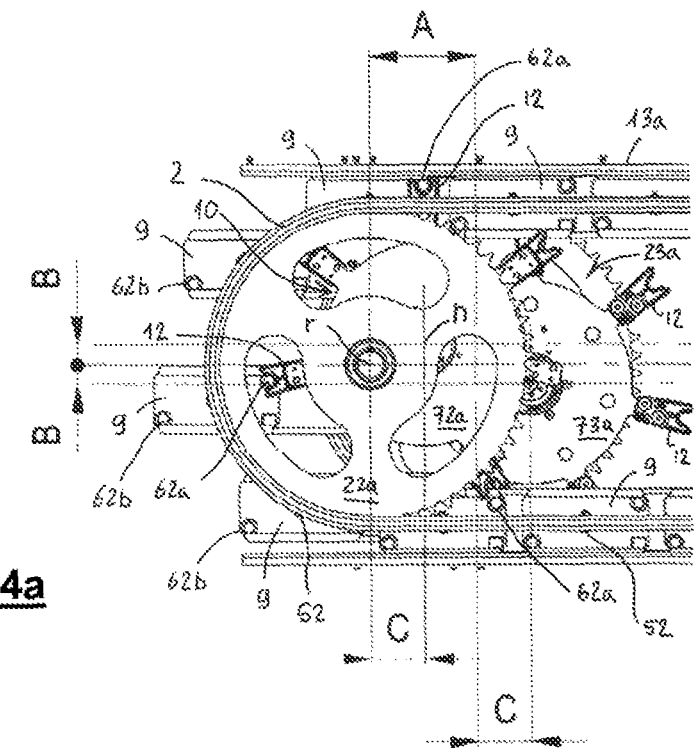
FIGS. 4a and 4b are both detailed views of the system of FIG. 3 and specifically of the areas in which the carriages follow a curved path.
Figure 4B:
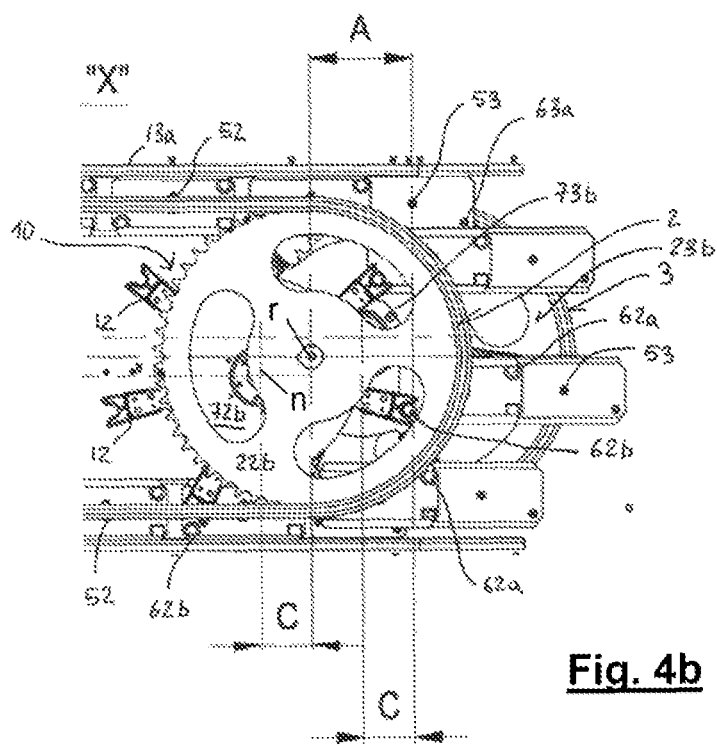

The arrangement shown in FIG. 3 can be seen in greater detail in FIGS. 4a, 5a and 4b, 5b in the following way:

FIGS. 4a and 5a show that in the downward curved path of the carriages 4, the protrusion 62a of the gear end 42 of the carriage 4 meshes with the castor wheel 72a, placed near chain 2; and the protrusion 63a of the gear 43 and of the carriage 4 meshes with the castor wheel 73a near chain 3; and FIGS. 4b and 5b show that in the upward curved path of the carriages 4, the protrusion 62b of the gear end 42 of the carriage 4 meshes with the castor wheel 72b, placed near the chain 2; and the protrusion 63b of the gear end 43 of the carriage 4 meshes with the castor wheel 73b near the chain 3;

The same contact elements 11 can optionally be used to control the orientation of the carriages 4 during the straight advance and return paths in a conventional way, for example by using guides 13a and 13b (see FIG. 3).

The embodiment explained above is especially suitable for a weighing machine 100 that requires a high degree of precision in the transport of the carriages 4 to avoid fluctuations in the measurement of weight in the buckets during the transportation of them.

In more simple machines, the control gear 10 does not necessarily require four castor wheels.

Figure 7A:
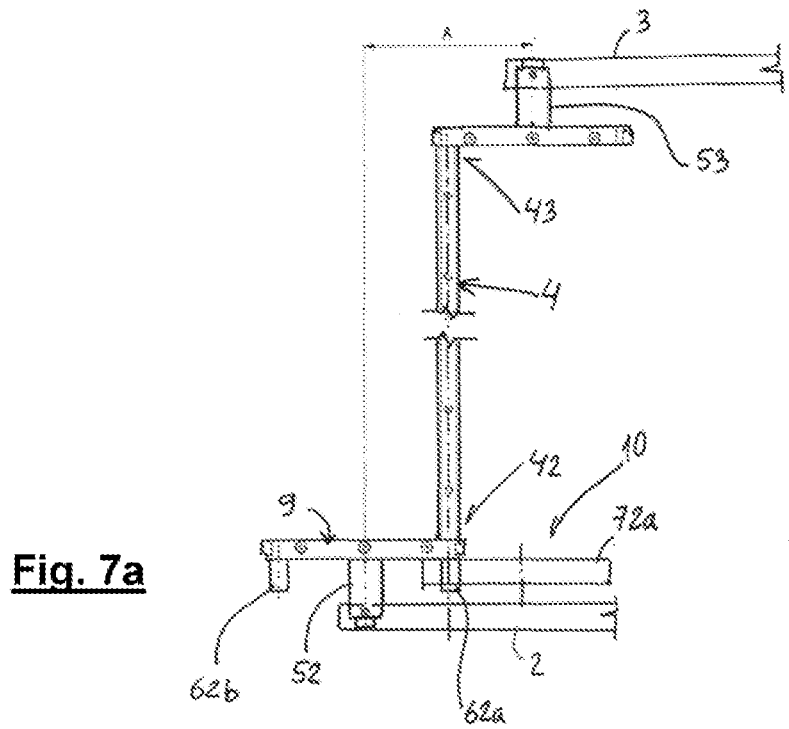
FIGS. 7a and 7b are both schematic plan views of the areas in which the carriages follow a curved path, in this case of a second embodiment of a transport system in accordance with the invention.
Figure 7B:
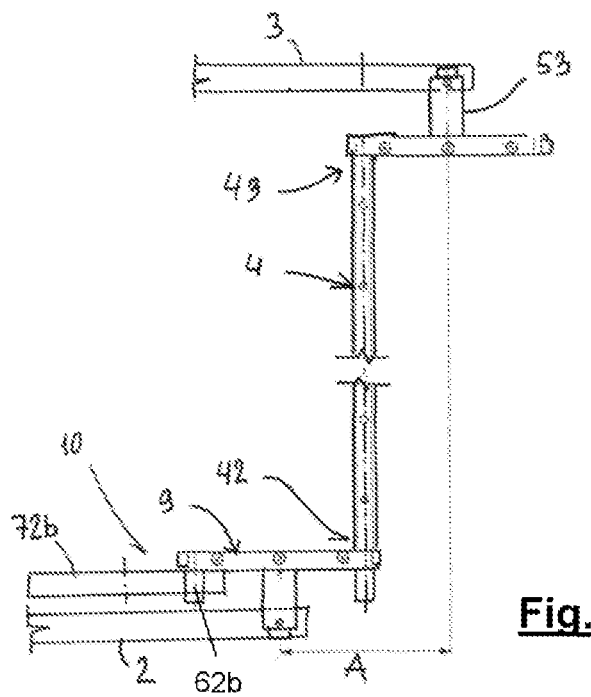

Therefore, for example, the variant of FIGS. 7a and 7b shows a schematic representation of the contact elements in the form of protrusions 62a and 62b and castor wheels 72a and 72b of a simplified control gear 10, that only contemplates the use of one castor wheel to control the orientation of the carriage 4 on its curved paths, specifically of a castor wheel 72a to control the orientation during the downward path of the carriage 4 and of a castor wheel 72b to control the orientation during the upward path of the carriage 4. With the castor wheels 72a and 72b arranged to the side of the same chain 2, it is not necessary that the carriage 4, in this case at its end opposite to the end of the gear 42, comprise a contact element.

Figure 8A:
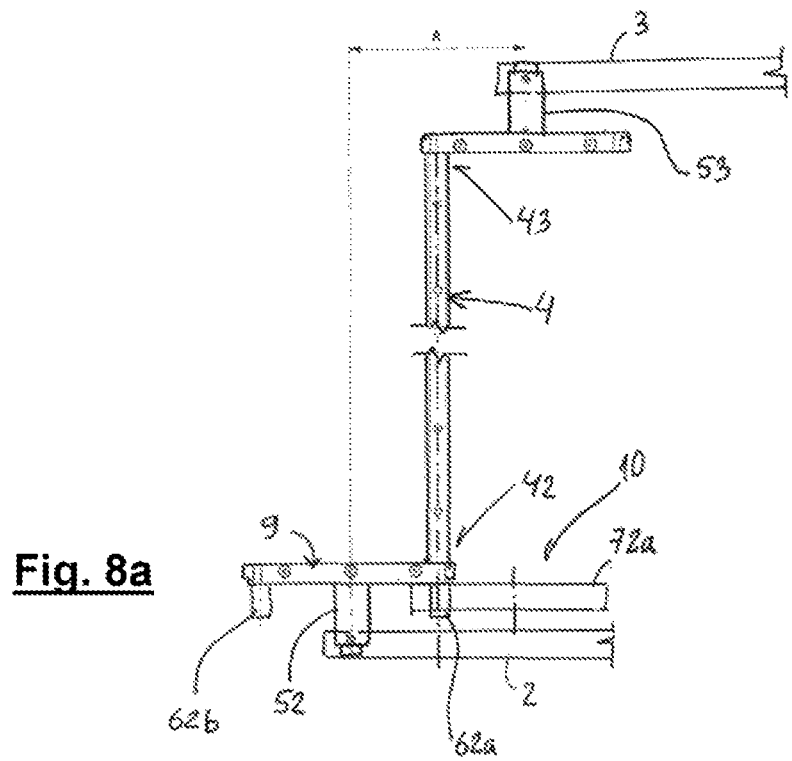
FIGS. 8a and 8b are both schematic plan views of the areas in which the carriages follow a curved path, in this case of a third embodiment of a transport system in accordance with the invention.
Figure 8B:
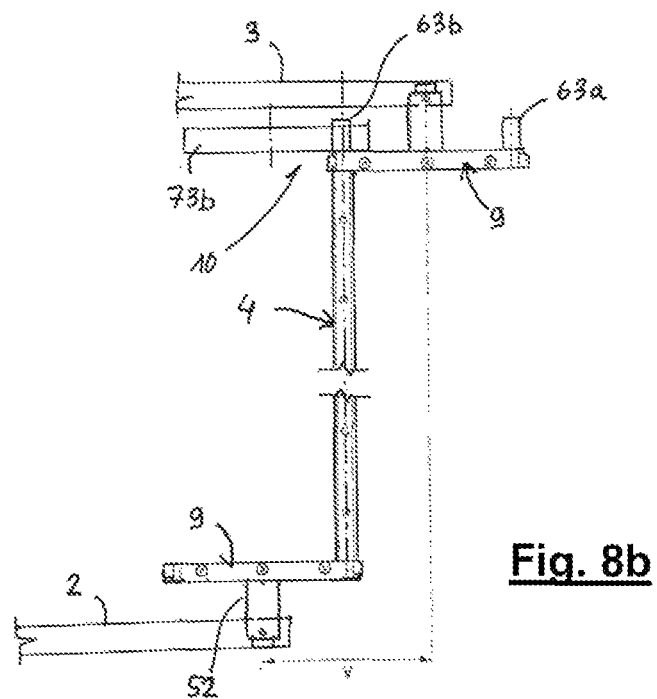

The variant of the FIGS. 8a and 8b show a variant that only contemplates the use of one castor wheel to control the orientation of the carriage 4 on its curved paths, but in this case the castor wheels are arranged on opposite sides of the transport system, the castor wheel 72a to the side of the chain 2 and the castor wheel 73b to the side of the chain 3.

Figure 9A:
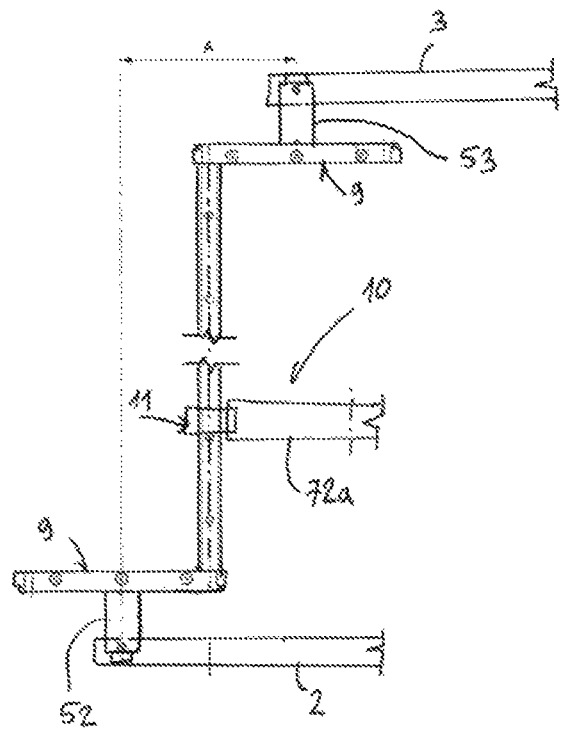
FIGS. 9a and 9b are both schematic plan views of the areas in which the carriages follow a curved path, in this case of a fourth embodiment of a transport system in accordance with the invention.
Figure 9B:
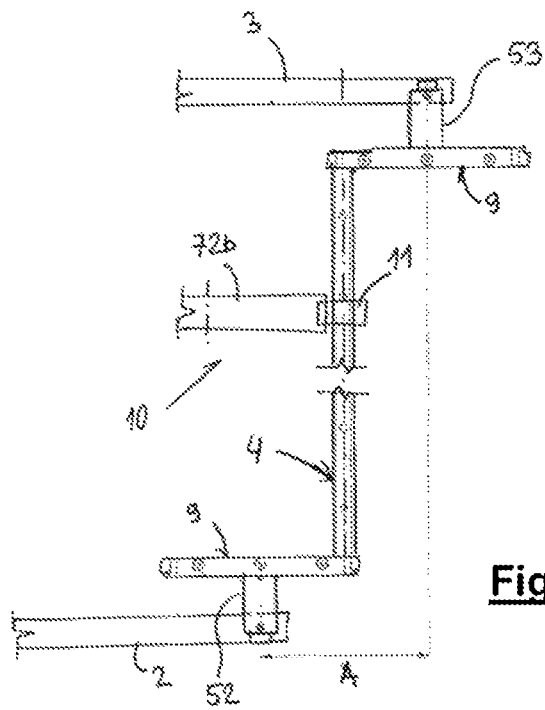

The variant of FIGS. 9a and 9b illustrates the solution in which the control gear 10 comprises castor wheels 72a and 72b in a position that is not at an end with respect to the carriage 4, referring to the way it meshes with contact elements 11 placed in an intermediate area with respect to the carriage 4.

The invention claimed is:

1. A transport system suitable for the transport of buckets in a combination weighing machine that comprises a first and a second endless chain drive, each one defining a closed path with a horizontal straight upper advance section, a lower horizontal straight return section and respective curved sections around corresponding centers of curvature r that link the advance and return sections, the first and second chain drives arranged parallel to each other but horizontally offset at a distance A, the system further comprising a series of carriages that carry the buckets which extend between the chains and which are connected in an articulated way to the chains by joining arms that are horizontally offset at the same distance A, such that the simultaneous and coordinated motion of the first and second chains makes the carriages move along a closed path having a horizontal straight upper advance section, a lower horizontal straight return section and curved sections linking the advance and return sections of the closed path of the carriages, the system further comprises control gears that control an inclination of the carriages on the curved sections of the closed path of the carriages and that, comprise castor wheels that are operable in a coordinated fashion with the chains around corresponding turn axes n, at least one being placed in a vicinity of each curved section of the carriages path to mesh with contact elements in the carriages, so that on said curved sections the inclination of each carriage is conditioned by the meshing between at least one of the contact elements and one of the castor wheels;

wherein the contact elements comprise a set of protrusions arranged on the carriages and configured to mesh in corresponding recesses provided in the castor wheels;

wherein in each curved section of the carriage path at least two protrusions of each carriage fit individually into a corresponding recess of a different one of the castor wheels; and wherein, with the number of castor wheels being four and each one located in the vicinity of each curved section of each chain, each carriage is equipped within a first and second gear end to mesh with the corresponding castor wheels, each one with at least a pair of the protrusions of which at least one on each gear end in each curved path of the carriage cooperates with the corresponding recess of the castor wheel located in the corresponding curved section of the associated chain.

2. The transport system according to claim 1, wherein the at least one protrusion on each gear end of the carriage that cooperates with a castor wheel located on the corresponding curved section of the associated chain is horizontally offset by a distance C with the corresponding joining arm that connects the carriage to each associated chain; and wherein the turn axis n of the castor wheel that cooperates with the aforementioned protrusion is horizontally offset at the same distance C with respect to the center of curvature r of the curved section that follows this same chain.

3. The transport system according to claim 2, wherein the number of protrusions on each gear end to mesh with the castor wheels is two, arranged in the advanced direction of the carriage one on each side of the joining arm that connects each carriage to a chain and equidistant from said joining arm at the same horizontal distance C; and arranged at a different level with respect to said joining arm one on top and another below the one on top, equidistant from said joining arm at the same vertical distance B;

and in that the castor wheels, located on the curved sections of the same chain that cooperate with protrusions of a same gear end of the carriage have their turn axes n vertically offset at the same distance B with respect to the center of curvature r of the mentioned curved sections of the chains.

4. The transport system according to claim 3, wherein the protrusions and the joining arm on each gear end of the carriages meshing with the castor wheels and connecting the carriage to the associated chain, respectively, are supported on the same plate fixed to or formed on the carriage, all of the plates having the same form as the arrangements of the protrusions on the fixed plates to one side and to the other of the carriage is symmetric with respect to the joining arm; and in correspondence the castor wheels of the same chain are arranged symmetrically with respect to the center of curvature r.

5. A method of operating the transport system of claim 1, comprising an operation of accompanying, through the control gears, the carriages on the curved sections of the path through the castor wheels actuated in coordination with the chains around both turn axes n.

* * * * *